June 22, 1954 R. WILLINGER 2,681,510
METHOD AND INSTRUMENT FOR MEASURING THE INTERNAL
PRESSURE AND THE LOADING OF VEHICLE TIRES
Filed Aug. 13, 1952 2 Sheets-Sheet 2

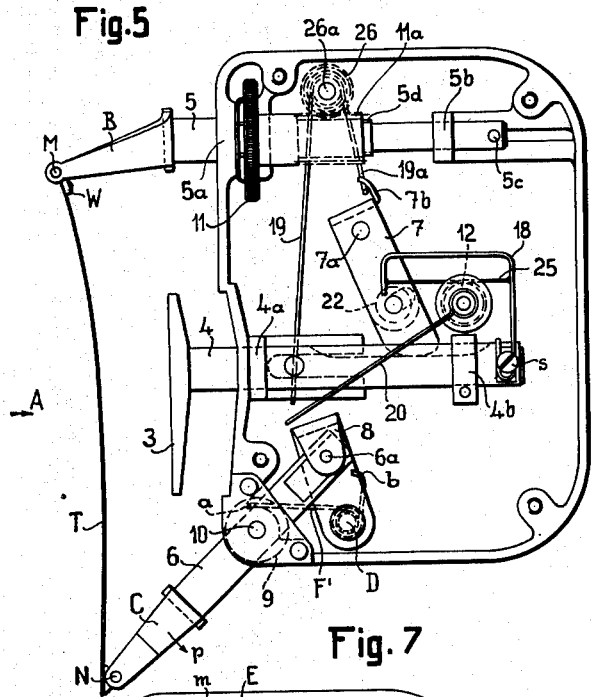

INVENTOR.
R. Willinger
BY
Glascott Downing Seebold
ATTYS.

UNITED STATES PATENT OFFICE 2,681,510

METHOD AND INSTRUMENT FOR MEASURING THE INTERNAL PRESSURE AND THE LOADING OF VEHICLE TIRES

Raimund Willinger, Innsbruck-Muhlau, Austria

Application August 13, 1952, Serial No. 304,081

Claims priority, application Austria August 22, 1951

15 Claims. (Cl. 33—172)

This invention relates to a method and instrument for measuring the internal pressure and the loading of vehicle tires.

To measure the internal pressure and the loading of vehicle tires, it has been suggested already to gauge the elastic deformation of the lowest zone of the tire by means of a plunger adjusting the indicator of a measuring instrument, which is applied to the external tire wall with two arms embracing the deformed tire zone.

It has been found that the accuracy of the measurement depends essentially on the application of the two arms of the instrument always at the same deformation delimiting zones of the tire wall.

Figure 1:
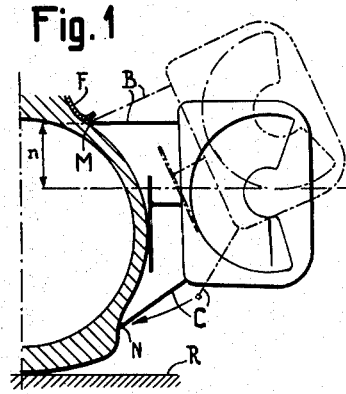

To meet this requirement the upper arm B (Fig. 1) of the instrument is applied first to one and the same point M of the tire just below the rim F. Then the instrument is pivotally moved about this point M out of the position shown in dash-and-dot lines, in the direction of the arrow, until its lower arm C, the end of which describes an arc of a circle having its center at M, contacts the tire wall at N, at the zone close to the roadway F. Fig. 1 illustrates the measuring procedure when the tire is unloaded.

Figure 2:
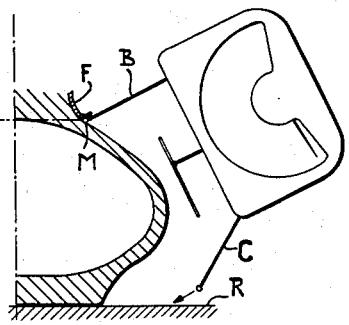

When the tire is loaded and its wall is deformed to the corresponding extent, as shown in Fig. 2, the point of application M for the upper arm B of the instrument approaches the road by a distance "$n$," which continuously increases with the deformation of the tire.

When in the case of a loaded tire the instrument is supported with its upper arm B on the same, though lower point of application M, and is pivotally moved thereafter, the lower arm C will contact the tire wall at a lower point and if the deformation is very large will meet the roadway so that measurement is no longer possible.

Figure 3:
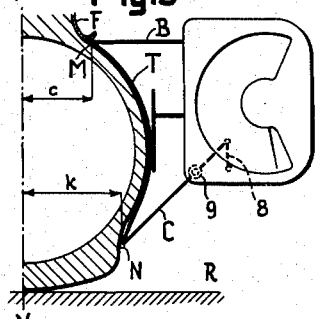

The new method of measurement is based on the recognition that for an accurate measurement of the condition of the tire it is essential that the two arms B, C be applied to such points of the tire wall which are always at the same distance $c$ or $k$, respectively, (Figs. 3, 4) from the central axis $x$—$y$ of the tire, independently of the extent of the deformation to be gauged. As regards the upper arm this requirement is met, as has been mentioned, if it is always applied just below the rim F at the point M, which is at the same distance $c$ regardless of the deformation of the tire.

As regards the lower arm C the requirement is met if it is applied always against the same point N in that zone where the relatively thin side wall of the tire merges into the thickened face thereof.

This requires a corresponding adjustment of the arm C as the instrument is applied. This adjustment may be effected most simply by means of a flexible, inelastic band T (Figs. 3, 4) extended between the points M—N and applied for measurement on the deformed tire zone to adjust the lower arm C so that the point N moves along a straight line which is vertical or only slightly deviates from the vertical direction and the distance $k$ of the point N from the central axis $x$—$y$ of the tire remains substantially constant. To this end the lower arm C is pivotally and slidably mounted, according to Figs. 3, 4, in the bore of a roller 9, and at its inner end, at $6a$, it is pivotally connected to the crank 8, which is rotatably mounted at 10.

Figs. 5 to 10 of the drawing illustrate several embodiments of the invention by way of examples.

Figs. 5 to 8 illustrate one embodiment of the invention,

Fig. 5 being a top plan view showing the measuring instrument with the cover removed, Fig. 6 is an elevation showing the instrument viewed in the direction of the arrow A in Fig. 5, Fig. 7 is a top plan view showing the closed instrument, and Fig. 8 illustrates the use of the instrument.

Figures 9, 10:
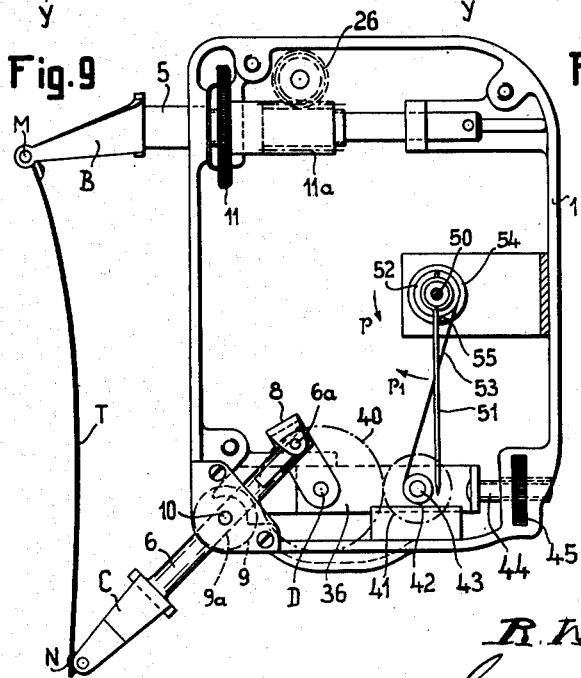

Fig. 9 is a top plan view showing a second embodiment of the measuring instrument, with the cover removed, and Fig. 10 is an elevation of the instrument viewed in the direction of the arrow P in Fig. 9.

In Figs 5 to 7, 1 designates the casing of the measuring instrument, 2 the cover, 3 the feeler plate of the plunger 4, which is guided in the casing at $4a$ and $4b$. 5 designates a bolt screwed to the upper arm B, the forked end of which provides bearings for the pin M. That pin has suspended therefrom by means of the rocker W one end of a flexible, non-extensible band T, e. g., of steel. The fork of the arm B is wide enough to permit of a good application thereof on the tire wall just below the rim F (point M, Fig. 8), and ensures that the subsequent pivotal movement of the instrument until the lower arm C contacts the tire wall (point N, Fig. 8) takes place in a vertical plane.

The lower end of the feeling band is fixed to the pin N, which is mounted in the forked end of the lower arm C. Arm C is screwed to bolt 6 and together with it is pivoted and slidably guided in the bore $9a$ of a roller 9 guided by pin 10 in the casing. At its inner end the bolt 6 is pivotally connected at $6a$ to the crank 8, which is rotatably mounted in the casing by means of the pin D. F' designates a prestressed torsion spring, one end of which is fixed to the casing at *a* and the other, wound-off end *b* of which bears on the bail 8. The moment of this prestressed spring tends to turn the bail, and the arm C pivotally connected thereto, in the sense of the arrow *p* (Fig. 5) to maintain the band T always tense.

The right-hand end of the plunger 4 has screwed to it at *s* the tightening bail 18, which transmits the movement of the feeler plate 3 by means of the tension rope 25 to the rope pulley 12, which operates the index 20 of the measuring instrument with a large transmission ratio. To arrest the index 20 in its respective indicating position in order to facilitate reading, the plunger 4 has a locking clamp, which consists of a pivoted U-shaped bail 7, which is mounted at 7*a* and one limb of which enters a groove in the plunger 4 to clamp the plunger 4 against movement in the direction toward the tire. The second limb is connected to a button 22 provided outside the casing. Operation (displacement) of said button in the direction of the arrow "*a*" will disengage the clamping means. A spring 19 mounted at 26*a* with one limb always urges the plunger 4 into its initial position, whereas its second limb 19*a* bears on the extension 7*b* of the clamping bail 7 to maintain it in clamping position.

A worm wheel 26 is mounted on the center 26*a* and in mesh with the worm 11*a*, which can be hand-operated by means of the adjusting wheel 11 extending on both sides out of the casing and having a milled rim. The worm wheel 26 has coupled to it a disk E (Fig. 7), which is visible outside the casing and from which the position of the adjustable arm B can be read in relation to a fixed mark *m*. This is possible by means of the following arrangement: The bolt 5 carrying the arm B is mounted at 5*a* and 5*b* and is secured against rotation at 5*c*. Further the bolt 5 extends coaxially through the worm wheel 11*a* and has a male thread 5*d* in mesh with a female thread in the worm 11*a*. Turning the adjusting wheel will adjust the arm B from or toward the instrument, by means of the thread 5*d*, whereas at the same time, owing to the worm 26, the degree of such turning can be read from the scale of the disk E.

The index 20 plays over a scale S, the graduation X of which may indicate the deformation of the tire in millimeters, whereas the pressure in the tire is read from the concentric arc of a circle Y.

The arcs of circles Z intersecting with the arcs of circles Y for pressure reading may indicate on the scale the loading in kilograms.

The color fields Ge (yellow), Gr (green), and Ro (red) indicate the speed limits for the vehicles, in conjunction with the pressure lines Z.

With a feeling band of a certain length mounted, the instrument is restricted to one type of tire. It can be adjusted to different forms of a type of tire by setting the feeling bail B. By exchanging the feeling band and reading scale the instrument can be adapted to any type of tire.

To use the instrument for measuring the internal pressure of a loaded tire, the upper arm B is first applied just below the rim F in an undeformed zone of the tire preferably in the horizontal plan comprising the center of the wheel. Then the instrument is moved against the tire until the lower arm C and the feeling band T also contact the tire wall.

If in this position of the instrument the index 20 of the scale S does not indicate "zero," because the feeler plate 3 has already been moved and has operated the indicating mechanism, the button 22 is displaced in the direction of the arrow "*a*" to disengage the clamping means of the index 20 and then the arm B is adjusted by rotating the adjusting wheel 11 until through the intermediary of the rope pulley 12 the index 20 is moved to the zero position of the scale S. With this setting the scale disk E (Fig. 7) is turned through the intermediary of the worm wheel 26 and the setting of the instrument for this tire becomes visible at a mark *m*.

Figure 4:
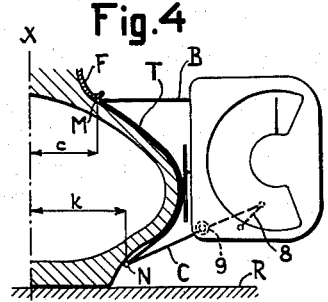

The instrument is now ready for measuring the internal pressure of the loaded tire by applying the instrument against the lowest and most deformed tire zone close to the roadway R as it is illustrated in Fig. 4.

The zero adjuster permits of measuring differences in the tire profile at the inflated tire outside the deformed zone thereof.

The zero adjustment also permits of detecting damage inside the tire, such as cord damage, which is not directly visible from the outside but gives rise to slight swellings.

Thus different types of tires give different zero readings on the E-scale.

The loading or air pressure of a tire can be determined reliably only if the instrument has been adjusted to the zero setting of the tire by means of the adjusting wheel 11.

To measure the loading or air pressure, the upper arm B (Fig. 8) is again applied to the point M just below the rim. Then the instrument is pivotally moved towards the tire until the lower arm C and the feeling band T fully contact the deformed side wall of the tire. At the same time the feeler plate 3 has adjusted the index 20 by means of the plunger 4 in accordance with the deformation of the tire. The index is arrested in its reading position by the clamping lock 7. The instrument may be removed from the tire and the result of measurement may be read conveniently. By displacing the button 22 the instrument is re-adjusted to its zero setting.

Normally the tire pressure is measured when the vehicle is unloaded. The deadweight of each vehicle and its distribution on the axles are known.

The loading of the tire at a given time is read from the position of the index 20 at the loading curves Z in conjunction with the arcuate pressure line Y indicating the pressure found when the vehicle was unloaded.

The admissible speed for the vehicle is roughly indicated by the index position in the corresponding color field Ge, Gr, or Ro of the scale S in conjunction with the pressure in the tire.

When long enough the feeling band may pass around rollers so that together with an adjusting device it may be used in graded lengths effective between the two arms of the instrument for different types (sizes) of tires, without an exchange of the band and of the arms.

In the embodiment shown in Figs. 9 and 10 no special plunger is arranged between the arms of the instrument for operating the indicator. The latter is operated by the lower arm C, which is controlled by the feeling band T as the instrument is applied on the deformed zone of the tire to the point N.

Just as shown in Figs. 5–8, the arm C is pivoted and slidably guided at the casing 1 of the instrument in the bore 9*a* of the pivoting roller 9 by means of the bolt 6. At its inner end the bolt 6 is pivotally connected to the crank 8 at 6a. The crank 8 is firmly mounted on the pin D mounted in the sliding member 36. 40 designates a gear firmly arranged on the pin D and in mesh with the gear 41, which by means of a pin 43 is also mounted rotatably in the sliding member 36, together with the roller 42.

The arbor 50 of the index 51 has rotatably mounted thereon the roller 52 for the fine steel rope 53, the lower end of which is fixed to the roller 42. The roller 52 is subjected to the action of a torsion spring (not shown), which tends to turn the roller constantly in the sense of the arrow p.

The roller 52 has firmly connected thereto a disk 54, which carries a pin 55 adjusting the index 51 in the direction of arrow p1 when the instrument is applied to the deformed tire zone.

The index arbor 50 is constantly braked by the friction disk 56 so that the index 51 remains in any indicating position until it is returned to its zero position against the action of the friction disk 56 by means of a knob 57.

To vary the path along which the lower arm C is adjusted, the sliding member 36 and the pivot pin D of the crank 8 may be adjusted by a screw 44, the nut 45 of which, being secured against axial displacement, is operated by hand.

The method and the measuring instrument according to the invention enable the direct measurement also of the linear deformation of the tire wall under the influence of the internal pressure and of the loading. These values may be read in millimeters from a special scale X (Fig. 7).

At the same time it is possible to alter the effective lengths of the lower arm C and/or of the crank 8, and to adjust the crank center D in order to influence the path along which the lower arm of the instrument is moved when the latter is being applied to the tire.

I claim:

1. In an instrument for measuring the internal pressure and the loading of vehicle tires by gauging the elastic deformation of the tire wall, comprising an upper arm and a lower arm applicable on the tire wall, the combination of means pivotally and slidably mounting said lower arm and control means to cause said lower arm to be applied always on substantially the same zone of the tire wall, said control means comprising a flexible, nonextensible band extending between the two arms and adapted to embrace the deformed tire zone.

2. In an instrument for measuring the internal pressure and the loading of vehicle tires by gauging the elastic deformation of the tire wall, comprising an upper arm and a lower arm applicable to the tire wall, and indicating means, the combination of means pivotally and slidably mounting said lower arm, control means to cause said lower arm to be applied always on substantially the same zone of the tirewall, said control means comprising a flexible, non-extensible band extending between the two arms and adapted to embrace the deformed tire zone, and a plunger provided inside said band between said two arms and operatively connected to said indicating means to adjust the same.

3. In an instrument for measuring the internal pressure and the loading of vehicle tires by gauging the elastic deformation of the tire wall, comprising an upper arm and a lower arm applicable to the tire wall, and indicating means, the combination of means pivotally and slidably mounting said lower arm, control means to cause said lower arm to be applied always on substantially the same zone of the tire wall, said control means comprising a flexible, non-extensible band extending between the two arms and adapted to embrace the deformed tire zone, and means operatively connecting said lower arm to said indicating means to adjust the same.

4. In an instrument for measuring the internal pressure and the loading of vehicle tires by gauging the elastic deformation of the tire wall, comprising an upper arm and a lower arm applicable to the tire wall, and indicating means, the combination of means pivotally and slidably mounting said lower arm, control means to cause said lower arm to be applied always on substantially the same zone of the tire wall, said control means comprising a flexible, non-extensible band extending between the two arms and adapted to embrace the deformed tire zone, and a step-up gearing operatively connecting said lower arm to said indicating means to adjust the same.

5. In an instrument for measuring the internal pressure and the loading of vehicle tires by gauging the elastic deformation of the tire wall, comprising a casing carrying an upper arm and a lower arm applicable on the tire wall, the combination of means pivotally and slidably mounting said lower arm in said casing and control means to cause said lower arm to be applied always on substantially the same zone of the tire wall, said control means comprising a flexible, nonextensible band extending between the two arms and adapted to embrace the deformed tire zone.

6. In an instrument for measuring the internal pressure and the loading of vehicle tires by gauging the elastic deformation of the tire wall, comprising a casing carrying an upper arm and a lower arm applicable on the tire wall, the combination of means pivotally and slidably mounting said lower arm in said casing, and control means to cause said lower arm to be applied always on substantially the same zone of the tire wall, said control means comprising a flexible, nonextensible band extending between the two arms and adapted to embrace the deformed tire zone, and a crank rotatably mounted in the casing, said lower arm having an inner end connected to said crank.

7. In an instrument for measuring the internal pressure and the loading of vehicle tires by gauging the elastic deformation of the tire wall, comprising a casing carrying an upper arm and a lower arm applicable on the tire wall, the combination of means pivotally and slidably mounting said lower arm in said casing, and control means to cause said lower arm to be applied always on substantially the same zone of the tire wall, said control means comprising a flexible, nonextensible band extending between the two arms and adapted to embrace the deformed tire zone, a crank rotatably mounted in the casing, said lower arm having an inner end connected to said crank, means to adjust the effective length of the lower arm, means to adjust the effective length of the crank, and means to adjust the center of the crank.

8. In an instrument for measuring the internal pressure and the loading of vehicle tires by gauging the elastic deformation of the tire wall, comprising an upper arm and a lower arm applicable on the tire wall, and indicating means having an index, the combination of means pivotally and slidably mounting said lower arm, control means to cause said lower arm to be applied always on substantially the same zone of the tire wall, said control means comprising a flexible, non-extensible band extending between the two arms and adapted to embrace the deformed tire zone, a plunger provided inside said band between said two arms, and a rope pulley drive operatively connected to said plunger and to said index and operable to adjust the same.

9. In an instrument for measuring the internal pressure and the loading of vehicle tires by gauging the elastic deformation of the tire wall, comprising an upper arm and a lower arm applicable on the tire wall, and indicating means having an index, the combination of means pivotally and slidably mounting said lower arm, control means to cause said lower arm to be applied always on substantially the same zone of the tire wall, said control means comprising a flexible, nonextensible band extending between the two arms and adapted to embrace the deformed tire zone, and a rope pulley drive operatively connected to said lower arm and to said index and operable to adjust the same.

10. In an instrument for measuring the internal pressure and the loading of vehicle tires by gauging the elastic deformation of the tire wall, comprising an upper arm and a lower arm applicable on the tire wall, and indicating means having an index, the combination of means pivotally and slidably mounting said lower arm, control means to cause said lower arm to be applied always on substantially the same zone of the tire wall, said control means comprising a flexible, nonextensible band extending between the two arms and adapted to embrace the deformed tire zone, and means operatively connecting said lower arm to said index to adjust the same, said last-mentioned means comprising a step-up gearing and a rope pulley drive.

11. In an instrument for measuring the internal pressure and the loading of vehicle tires by gauging the elastic deformation of the tire wall, the combination of a casing carrying an upper and a lower arm applicable on the tire wall, means pivotally and slidably mounting said lower arm in said casing, and control means to cause said lower arm to be applied always on substantially the same zone of the tire wall, said control means comprising a flexible, nonextensible band extending between the two arms and adapted to embrace the deformed tire zone, said two arms and said band forming a unit detachably connected to said casing.

12. In an instrument for measuring the internal pressure and the loading of vehicle tires by gauging the elastic deformation of the tire wall, comprising an upper arm and a lower arm applicable on the tire wall, and indicating means, the combination of means pivotally and slidably mounting said lower arm, control means to cause said lower arm to be applied always on substantially the same zone of the tire wall, said control means comprising a flexible, nonextensible band extending between the two arms and adapted to embrace the deformed tire zone, arresting means adapted to hold the indicating means in reading position, a release in cooperation with said arresting means and operable to disengage the same from the indicating means, and returning means connected to said indicating means and tending to return it into its initial position.

13. The combination of claim 12, in which said arresting means comprise a locking clamp.

14. The combination of claim 12, in which said arresting means comprise a brake.

15. In an instrument for measuring the internal pressure and the loading of vehicle tires by gauging the elastic deformation of the tire wall, comprising an upper arm and a lower arm applicable on the tire wall, and indicating means having an index, the combination of means pivotally and slidably mounting said lower arm, control means to cause said lower arm to be applied always on substantially the same zone of the tire wall, said control means comprising a flexible, non-extensible band extending between the two arms and adapted to embrace the deformed tire zone, arresting means adapted to hold said index in a reading position, a release in cooperation with said arresting means and operable to disengage the same from said index, and returning means connected to said indicating means and tending to return it into its initial position.

References Cited in the file of this patent

FOREIGN PATENTS

| Number | Country | Date |
|--------|---------|------|
| 659,950 | France | July 4, 1929 |